United States Patent
Nakajima (10) Patent No.: US 9,932,923 B2
(45) Date of Patent: Apr. 3, 2018

(54) ABNORMALITY DETERMINATION APPARATUS

(71) Applicant: Toyota Jidosha Kabushiki Kaisha, Toyota-shi (JP)

(72) Inventor: Isao Nakajima, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 210 days.

(21) Appl. No.: 15/078,031

(22) Filed: Mar. 23, 2016

(65) Prior Publication Data
US 2016/0281625 A1    Sep. 29, 2016

(30) Foreign Application Priority Data

Mar. 27, 2015  (JP) .................................. 2015-066988

(51) Int. Cl.
*G06F 17/00* (2006.01)
*F02D 41/22* (2006.01)
(Continued)

(52) U.S. Cl.
CPC ......... *F02D 41/22* (2013.01); *F02D 19/0692* (2013.01); *F02D 19/084* (2013.01);
(Continued)

(58) Field of Classification Search
CPC .............. F02D 19/029; F02D 19/0623; F02D 19/0634; F02D 19/0655; F02D 19/087
See application file for complete search history.

(56) References Cited

U.S. PATENT DOCUMENTS 7,950,269 B2 *  5/2011  Maeda ................ F02D 41/0025
                                                    73/114.45
8,150,599 B2 *  4/2012  Nishimura .......... F02D 19/0628
                                                    123/431
(Continued)

FOREIGN PATENT DOCUMENTS

JP    2010024996 A  *  2/2010  ......... F02D 41/3094
JP    2014-34943        2/2014
JP    2014-95321        5/2014

OTHER PUBLICATIONS

Kitazume, JP 2010-24996, Feb. 4, 2010, machine translation.*

*Primary Examiner* — Hung Q Nguyen
*Assistant Examiner* — Mark L Greene
(74) *Attorney, Agent, or Firm* — Oblon, McClelland, Maier & Neustadt, L.L.P.

(57) ABSTRACT

An internal combustion engine to which the apparatus is applied is a multi-cylinder internal combustion engine that includes a passage injection valve and a cylinder injection valve and that can use gasoline and alcohol as fuel. The apparatus performs abnormality determination for a determination object device, based on a detection signal of an oxygen sensor provided in an exhaust passage of the internal combustion engine. The concentration sensor detects alcohol concentration ALp of the fuel in a first fuel passage through which the fuel is fed to the passage injection valve, and alcohol concentration ALd of the fuel in a second fuel passage through which the fuel is fed to the cylinder injection valve. When a difference ΔAL between the alcohol concentrations ALp, ALd is a determination value or greater (S13: YES), the execution of the abnormality determination is prohibited (S12).

4 Claims, 4 Drawing Sheets

(51) Int. Cl.
*F02D 41/00* (2006.01)
*F02D 41/14* (2006.01)
*G01M 15/10* (2006.01)
*F02D 41/30* (2006.01)
*F02D 19/06* (2006.01)
*F02D 19/08* (2006.01)

(52) U.S. Cl.
CPC ..... *F02D 41/0025* (2013.01); *F02D 41/1454* (2013.01); *F02D 41/1495* (2013.01); *F02D 41/222* (2013.01); *F02D 41/3094* (2013.01); *G01M 15/104* (2013.01); *F02D 19/087* (2013.01); *F02D 19/088* (2013.01); *Y02T 10/36* (2013.01)

(56) References Cited

U.S. PATENT DOCUMENTS

| | | | |
|---|---|---|---|
| 8,225,647 B2* | 7/2012 | Mukai | F02D 19/0623 73/114.55 |
| 2009/0314071 A1* | 12/2009 | Mukai | F02D 19/0623 73/114.38 |
| 2010/0145596 A1* | 6/2010 | Nishimura | F02D 19/0628 701/103 |
| 2011/0000467 A1* | 1/2011 | Maeda | F02D 41/0025 123/494 |
| 2015/0136087 A1* | 5/2015 | Ikeya | F02D 41/0025 123/456 |
| 2016/0017819 A1* | 1/2016 | Miyata | F02D 41/3094 701/104 |
| 2016/0208720 A1* | 7/2016 | Hayashi | F02D 41/32 |

* cited by examiner

ABNORMALITY DETERMINATION APPARATUS

INCORPORATION BY REFERENCE

The disclosure of Japanese Patent Application No. 2015-066988 filed on Mar. 27, 2015 including the specification, drawings and abstract is incorporated herein by reference in its entirety.

BACKGROUND OF THE INVENTION

1. Field of the Invention

The invention relates to an abnormality determination apparatus that performs abnormality determination for a determination object device based on a detection signal of an oxygen sensor provided in an exhaust passage of a multi-cylinder internal combustion engine.

2. Description of Related Art

Japanese Patent Application Publication No. 2014-95321 discloses that an internal combustion engine is provided with a fuel injection valve (passage injection valve) that is a type to inject fuel into an intake passage, and a fuel injection valve (cylinder injection valve) that is a type to directly inject the fuel into a cylinder. Such an internal combustion engine feeds the fuel into the cylinder, by concurrently executing the drive control of the passage injection valve and the drive control of the cylinder injection valve, depending on the operation state.

Further, JP 2014-95321A discloses an internal combustion engine that can use gasoline and alcohol as the fuel. The internal combustion engine can perform an operation of using only alcohol or only gasoline as the fuel, and in addition, can perform an operation of using a mixed fuel in which alcohol and gasoline are mixed at an arbitrary proportion.

In recent years, there has been practically used an abnormality determination apparatus that performs abnormality determination for a determination object device (a fuel injection valve, an exhaust gas purification catalyst, or the like) based on a detection signal of an oxygen sensor provided in an exhaust passage of a multi-cylinder internal combustion engine. As such an abnormality determination apparatus, for example, there is known an apparatus that determines the occurrence of an abnormality (imbalance abnormality) in which the air-fuel ratio of air-fuel mixture becomes unequal (imbalanced) among the cylinders of the internal combustion engine. The imbalance of the air-fuel ratio of the air-fuel mixture among the cylinders of the internal combustion engine increases the fluctuation in the air-fuel ratio of the air-fuel mixture in one combustion cycle of the internal combustion engine. For example, the above abnormality determination apparatus forms a temporal waveform of the air-fuel ratio of the air-fuel mixture, based on the detection signal of the oxygen sensor, and determines the occurrence of the imbalance abnormality when the change rate of the air-fuel ratio in the temporal waveform is high.

SUMMARY OF THE INVENTION

In the apparatus described in JP 2014-95321A, when a fuel tank is refueled with a fuel having a different alcohol concentration, a difference in the alcohol concentration of the fuel is sometimes made between a first fuel passage for feeding the fuel to the passage injection valve and a second fuel passage for feeding the fuel to the cylinder injection valve, in a process of the change in the alcohol concentration of the fuel in fuel passages for distributing and feeding the fuel from the fuel tank to the injection valves.

If the engine operation state changes with such a difference made and the ratio between the fuel injection amount of the passage injection valve and the fuel injection amount of the cylinder injection valve changes, the proportion of the alcohol contained in the fuel that is injected from both injection valves into the cylinder before the change in the engine operation state and the proportion of the alcohol contained in the fuel that is injected from both injection valves into the cylinder after the change in the engine operation state become different in value from each other. Then, when the proportion of the alcohol contained in the fuel changes in this way, the oxygen concentration of exhaust gas also changes. Therefore, when the above-described abnormality determination based on the output signal of the oxygen sensor is executed at this time, the oxygen concentration of the exhaust gas is likely to change during the execution, causing the decrease in the determination accuracy of the abnormality determination.

The invention provides an abnormality determination apparatus that can inhibit the decrease in the determination accuracy of the abnormality determination associated with refueling.

An abnormality determination apparatus according to an aspect of the invention is applied to a multi-cylinder internal combustion engine including a passage injection valve that injects fuel into an intake passage and a cylinder injection valve that directly injects the fuel into a cylinder and being capable of using gasoline and alcohol as the fuel. The abnormality determination apparatus performs abnormality determination for a determination object device, based on a detection signal of an oxygen sensor provided in an exhaust passage of the internal combustion engine. Further, the abnormality determination apparatus includes a concentration detection unit that detects alcohol concentration of the fuel in a first fuel passage through which the fuel is fed to the passage injection valve and alcohol concentration of the fuel in a second fuel passage through which the fuel is fed to the cylinder injection valve. Then, the abnormality determination apparatus prohibits execution of the abnormality determination, when a difference between the alcohol concentration of the fuel in the first fuel passage and the alcohol concentration of the fuel in the second fuel passage that are detected by the concentration detection unit is a determination value or greater. The aspect of the invention can be defined as follows. The aspect of the invention is an abnormality determination apparatus that performs abnormality determination for a determination object device based on a detection signal of an oxygen sensor provided in an exhaust passage of an internal combustion engine, the internal combustion engine including a passage injection valve that injects fuel into an intake passage, and a cylinder injection valve that directly injects the fuel into a cylinder, the internal combustion engine being applied to a multi-cylinder internal combustion engine capable of using gasoline and alcohol as the fuel, the abnormality determination apparatus including an electronic control unit configured to detect alcohol concentration of the fuel in a first fuel passage and alcohol concentration of the fuel in a second fuel passage, the first fuel passage being a passage through which the fuel is fed to the passage injection valve, the second fuel passage being a passage through which the fuel is fed to the cylinder injection valve, and prohibit execution of the abnormality determination, when a difference between the alcohol concentration of the fuel in the first fuel passage and the alcohol concentration of the fuel in the second fuel passage is a determination value or greater.

According to the above apparatus, when there is a possibility of the decrease in the determination accuracy of the abnormality determination based on the detection signal of the oxygen sensor provided in the exhaust passage, because of the increase in the difference between the alcohol concentration of the fuel in the first fuel passage corresponding to the passage injection valve and the alcohol concentration of the fuel in the second fuel passage corresponding to the cylinder injection valve due to refueling, it is possible to prohibit the execution of the abnormality determination. Therefore, it is possible to inhibit the false determination associated with refueling, and to inhibit the decrease in the determination accuracy of the abnormality determination.

In the above abnormality determination apparatus, a fuel passage that distributes and feeds the fuel to the passage injection valve and the cylinder injection valve may be provided with a common passage, the common passage being provided with a concentration sensor that detects alcohol concentration of the fuel, one end of the common passage being connected with a fuel tank in which the fuel is stored, the other end of the common passage being connected with the first fuel passage and the second fuel passage. Further, the concentration detection unit may detect the alcohol concentration of the fuel in the first fuel passage and the alcohol concentration of the fuel in the second fuel passage, based on the alcohol concentration detected by the concentration sensor, an amount of the fuel injected from the passage injection valve and an amount of the fuel injected from the cylinder injection valve.

In the above apparatus, when the alcohol concentration of the fuel in the fuel tank changes due to refueling, the concentration sensor provided in the common passage can detect the alcohol concentration of the fuel that is fed from the fuel tank to the injection cylinders. Furthermore, from the amount of the fuel injected from the passage injection valve and the amount of the fuel injected from the cylinder injection valve, it is possible to estimate how much the fuel in the fuel passage (the common passage, the first fuel passage and the second fuel passage) has been exchanged with the fuel after refueling. Therefore, according to the above apparatus, it is possible to figure out the alcohol concentration of the fuel in each part of the fuel passage, based on the alcohol concentration detected by the concentration sensor, the amount of the fuel injected from the passage injection valve and the amount of the fuel injected from the cylinder injection valve. Thereby, it is possible to accurately detect the alcohol concentration of the fuel in the first fuel passage and the alcohol concentration of the fuel in the second fuel passage.

In the above abnormality determination apparatus, a connection part of the first fuel passage with the passage injection valve may form a first delivery pipe, and a connection part of the second fuel passage with the cylinder injection valve may form a second delivery pipe. The concentration detection unit may detect average concentration of the fuel in the first delivery pipe, as the alcohol concentration of the fuel in the first fuel passage, and may detect average concentration of the fuel in the second delivery pipe, as the alcohol concentration of the fuel in the second fuel passage.

In the above apparatus, after refueling, the distribution of the alcohol concentration is temporarily made in the fuel within each delivery pipe. The influence of the concentration distribution on the abnormality determination, which is smaller compared to the influence of the above-described difference in alcohol concentration between the fuel in the first fuel passage and the fuel in the second fuel passage, does not matter too much.

In this regard, the above apparatus detects the average concentrations of the fuels in the delivery pipes, as the alcohol concentration of the fuel in the first fuel passage and the alcohol concentration of the fuel in the second fuel passage. Therefore, it is possible to calculate the difference in alcohol concentration between the fuel in the first fuel passage and the fuel in the second fuel passage, in a simple calculation manner, while the alcohol concentrations of the fuels in the delivery pipes are regarded as being not distributed. Accordingly, it is possible to execute, in a simple manner, the determination of whether to execute the abnormality determination, based on the above difference in alcohol concentration.

The above abnormality determination apparatus may prohibit the execution of the abnormality determination, when at least one of a condition (first condition) that convergence degree of change in the alcohol concentration of the fuel in the first fuel passage is a predetermined level or higher and a condition (second condition) that convergence degree of change in the alcohol concentration of the fuel in the second fuel passage is a predetermined level or higher is not satisfied in a process during which the alcohol concentration of the fuel in the first fuel passage and the alcohol concentration of the fuel in the second fuel passage change due to a change in alcohol concentration associated with refueling.

When the change in the alcohol concentration of the fuel in the first fuel passage associated with refueling and the change in the alcohol concentration of the fuel in the second fuel passage associated with refueling have not converged, the variable ranges of the alcohol concentrations are large, and therefore, there is a fear that the difference in alcohol concentration increases. Further, even when the difference in alcohol concentration at this time is small, there is a possibility that the concentration difference increases due to a subsequent progression of the change in alcohol concentration. When the above-described abnormality determination is executed in a situation in which the change in the alcohol concentration of the fuel in the first fuel passage or the change in the alcohol concentration of the fuel in the second fuel passage has not converged, there is a fear of causing the decrease in the determination accuracy of the abnormality determination. In this regard, the above apparatus prohibits the execution of the abnormality determination, when the convergence degree of the change in the alcohol concentration of the fuel in the first fuel passage or the fuel in the second fuel passage is low, and therefore, it is possible to inhibit the decrease in the determination accuracy of the abnormality determination.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
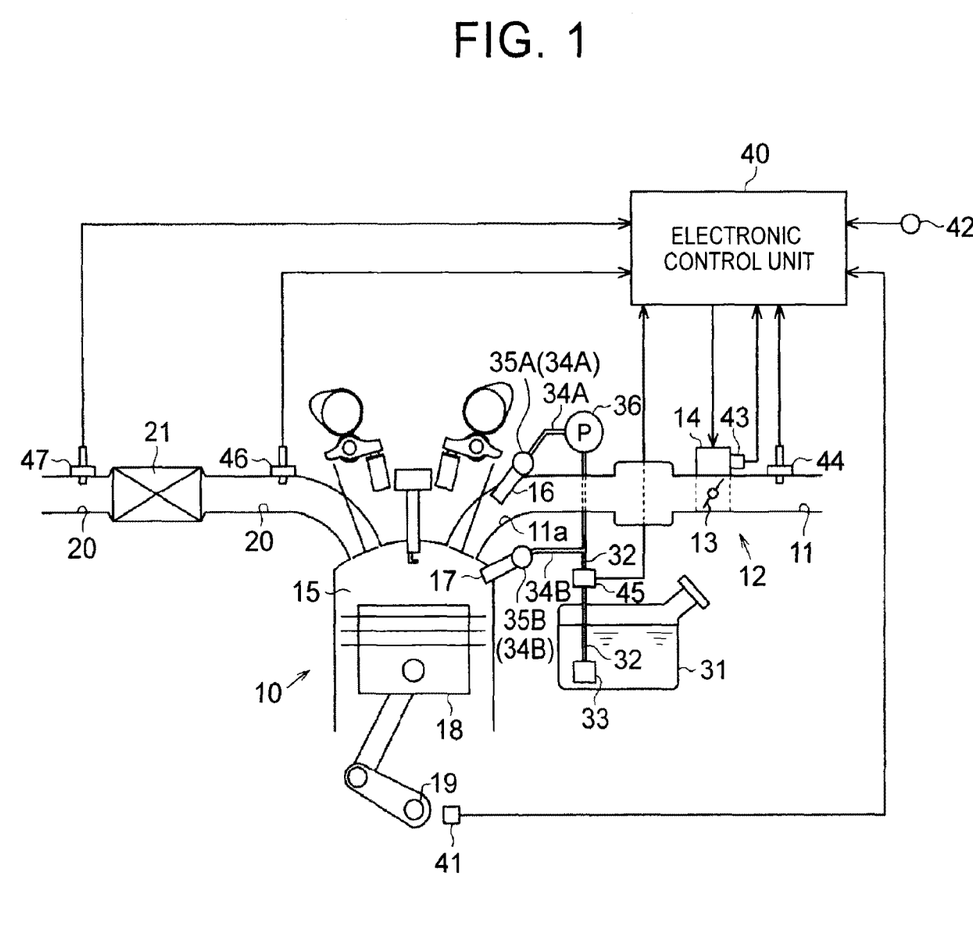
FIG. 1 is a simplified diagram showing a schematic configuration of an internal combustion engine to which an abnormality determination apparatus in an embodiment is applied.

Hereinafter, an embodiment of an abnormality determination apparatus will be described. As shown in FIG. 1, a throttle mechanism 12 is provided in an intake passage 11 of an internal combustion engine 10. The throttle mechanism 12 includes a throttle valve 13 and a throttle motor 14. Then, the position (throttle position TA) of the throttle valve 13 is regulated by the drive control of the throttle motor 14, and thereby, the amount (intake air amount GA) of the air to be taken in a combustion chamber 15 through the intake passage 11 is regulated.

Further, in the above intake passage 11, a fuel injection valve (passage injection valve 16) is provided. The passage injection valve 16, by the valve opening drive, injects fuel into the interior of the intake passage 11 (for details, an intake port 11a). In the internal combustion engine 10, a fuel injection valve (cylinder injection valve 17) is provided, in addition to the above passage injection valve 16. The cylinder injection valve 17, by the valve opening drive, injects the fuel into the interior of a cylinder (for details, the combustion chamber 15) of the internal combustion engine 10. Here, the internal combustion engine 10 is a multi-cylinder (in the embodiment, four-cylinder) internal combustion engine, and the above passage injection valve 16 and the cylinder injection valve 17 are provided for each cylinder. Further, as the internal combustion engine 10, the embodiment employs an internal combustion engine that can perform an operation of using only alcohol (specifically, ethanol) or only gasoline as the fuel, and in addition, that can perform an operation of using a mixed fuel in which alcohol and gasoline are mixed at an arbitrary proportion.

In the combustion chamber 15 of the internal combustion engine 10, the air-fuel mixture composed of the intake air and the injected fuel is ignited and combusted. By the combustion, a piston 18 reciprocates, and a crankshaft 19 revolves. Then, the air-fuel mixture after the combustion is sent from the combustion chamber 15 to an exhaust passage 20, as the exhaust gas, and is purified by an exhaust gas purification catalyst 21 provided in the exhaust passage 20.

The internal combustion engine 10 is provided with a fuel feed system for feeding the fuel to the passage injection valve 16 and the cylinder injection valve 17. The fuel feed system includes a fuel tank 31 in which the fuel is stored. With the fuel tank 31, a common passage 32 is connected, and the common passage 32 is provided with a feed pump 33. With the common passage 32, which has a structure of branching in two ways at the end on the downstream side in the fuel transfer direction (hereinafter, referred to as merely the downstream side), two fuel passage (a first fuel passage 34A and a second fuel passage 34B) are connected. A part on the downstream side of the first fuel passage 34A is configured by a first delivery pipe 35A, and the passage injection valve 16 is connected with the delivery pipe 35A. On the other hand, a part on the downstream side of the second fuel passage 34B is configured by a second delivery pipe 35B, and the cylinder injection valve 17 is connected with the delivery pipe 35B. Further, the second fuel passage 34B is provided with a high-pressure pump 36 that transfers the fuel in the passage 34B.

In the above fuel feed system, the fuel in the fuel tank 31 is pumped up by the feed pump 33 and is transferred to the common passage 32. Then, the fuel in the common passage 32 is fed to the passage injection valve 16 through the first fuel passage 34A (delivery pipe 35A). Further, the fuel in the common passage 32 is fed to the cylinder injection valve 17 through the second fuel passage 34B (delivery pipe 35B), while the pressure is raised by the high-pressure pump 36 provided at the second fuel passage 34B. Thus, in the above fuel feed system, the common passage 32, the first fuel passage 34A and the second fuel passage 34B function as a fuel passage that distributes and feeds the fuel to the passage injection valve 16 and the cylinder injection valve 17.

The internal combustion engine 10 includes an electronic control unit (ECU) 40 configured to have a microcomputer, for example. The electronic control unit 40 takes detection signals of various sensors for detecting the operation state of the internal combustion engine 10.

As the various sensors, there are provided, for example, a crank sensor 41 for detecting the speed (engine speed NE) of the crankshaft 19, and an accelerator sensor 42 for detecting the operation amount (accelerator operation amount ACC) of an accelerator operation member (not illustrated). Further, there are provided a throttle sensor 43 for detecting the position (throttle position TA) of the throttle valve 13, and an air flow meter 44 for detecting the intake air amount GA. Furthermore, a concentration sensor 45 for detecting alcohol concentration AL of the fuel is provided in the common passage 32 of the fuel feed system.

In addition, an air-fuel ratio sensor 46, which is an oxygen sensor to output a signal depending on the oxygen concentration of the exhaust gas, is provided at a part on the upstream side in the exhaust-gas flow direction of the exhaust passage 20 relative to the above exhaust gas purification catalyst 21 (for details, at an exhaust manifold). The lean degree and rich degree for the air-fuel ratio (actual air-fuel ratio AF) of the air-fuel mixture are detected based on an output signal of the air-fuel ratio sensor 46. Further, an O2 sensor 47, which is an oxygen sensor to output a signal depending on the oxygen concentration of the exhaust gas, is provided on the downstream side in the exhaust-gas flow direction of the exhaust passage 20 relative to the above exhaust gas purification catalyst 21. Whether the exhaust gas to flow out of the exhaust gas purification catalyst 21 has a property corresponding to a lean gas or a property corresponding to a rich gas is detected based on the output signal of the O2 sensor 47. In the embodiment, the air-fuel ratio sensor 46, the O2 sensor 47 and the electronic control unit 40 correspond to the concentration detection unit.

The electronic control unit 40 performs various computations, based on the detection signals of the various sensors, and executes engine controls such as a throttle control and a fuel injection control, based on the computation results. The throttle control is executed as follows. That is, a control target value (target throttle position Tta) for the throttle position TA is set based on the accelerator operation amount ACC and the engine speed NE, and the actuation control of the throttle mechanism 12 is executed such that the actual throttle position TA coincides with the target throttle position Tta. Such a throttle control allows for the regulation of the amount of the air that is actually taken in the combustion chamber 15 of the internal combustion engine 10.

Further, the fuel injection control is executed basically as follows. That is, first, a fuel injection amount by which the air-fuel ratio of the air-fuel mixture to be supplied for the combustion in the combustion chamber 15 becomes a desired ratio with respect to the intake air amount GA is calculated as a control target value (injection requirement amount Tq). Further, the ratio (port injection ratio Rp) of the fuel injection from the passage injection valve 16 is calculated based on the engine speed NE, the intake air amount GA and the alcohol concentration AL.

Then, the amount (Tq×Rp) resulting from multiplying the injection requirement amount Tq by the port injection ratio Rp is calculated as a control target value (target port injection amount Tqp) for the fuel injection amount from the passage injection valve 16, and the valve opening drive of the passage injection valve 16 is performed such that the same amount of fuel as the target port injection amount Tqp is injected. Further, the amount (Tq×[1.0−Rp]) resulting from multiplying the injection requirement amount Tq by the ratio (=1.0−Rp) of the fuel injection from the cylinder injection valve 17 is calculated as a control target value (target cylinder injection amount Tqc) for the fuel injection amount from the cylinder injection valve 17, and the valve opening drive of the cylinder injection valve 17 is performed such that the same amount of fuel as the target cylinder injection amount Tqc is injected.

By such a fuel injection control, the fuel is injected by an amount corresponding to the operation state of the internal combustion engine 10 of the moment, from the passage injection valve 16 and the cylinder injection valve 17, and is fed into the cylinder of the internal combustion engine 10.

In the embodiment, the abnormality determination for a determination object device (specifically, the passage injection valve 16, the cylinder injection valve 17, the exhaust gas purification catalyst 21 or the O2 sensor 47) is executed based on the detection signal of the air-fuel ratio sensor 46 and the detection signal of the O2 sensor 47.

In the internal combustion engine 10, the air-fuel ratio of the air-fuel mixture sometimes becomes unequal (imbalanced) among the cylinders, for example, due to the deterioration of the passage injection valve 16 or the cylinder injection valve 17. In the embodiment, a process (imbalance abnormality determination process) of determining the occurrence of the imbalance abnormality is executed.

Figure 2:
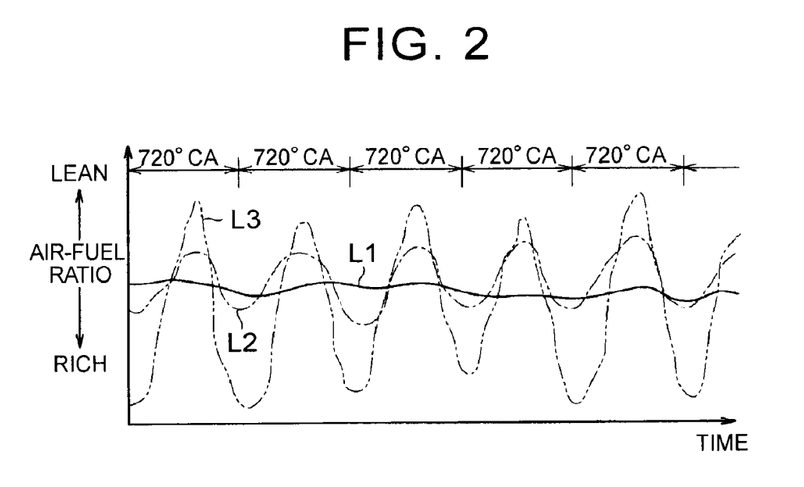
FIG. 2 is a timing chart showing the change in air-fuel ratio fluctuation depending on the degree of imbalance.

FIG. 2 shows the fluctuation in the air-fuel ratio for each one combustion cycle (720° C.A) in which the combustion is performed once through all cylinders of the internal combustion engine, and particularly, shows a fluctuation manner of the actual air-fuel ratio AF to be detected by the air-fuel ratio sensor 46 for the case where the fuel injection amount of a certain cylinder is purposely deviated so that the air-fuel ratio of the air-fuel mixture becomes unequal among the cylinders. Here, a solid line L1 in FIG. 2 shows the fluctuation in the actual air-fuel ratio AF when the inequality of the air-fuel ratio among the cylinders does not occur. Further, a chain line L2 in FIG. 2 shows the fluctuation in the actual air-fuel ratio AF when the fuel injection amount of the certain cylinder is deviated by a predetermined amount A1 so that the air-fuel ratio becomes unequal among the cylinders. Furthermore, a two-dot chain line L3 in FIG. 2 shows the fluctuation in the actual air-fuel ratio AF when the fuel injection amount of the certain cylinder is deviated by a predetermined amount A2, which is greater than the above predetermined amount A1, so that the air-fuel ratio becomes unequal among the cylinders.

As shown by the solid line L1 in FIG. 2, for the actual air-fuel ratio AF, a periodic fluctuation is repeated such that one period is one combustion cycle of the internal combustion engine 10. Then, as shown by the chain line L2, when the variation in the fuel injection amount among the cylinders is generated and the difference in the air-fuel ratio among the cylinders is made, the fluctuation amount of the actual air-fuel ratio AF in one combustion cycle increases. Then, as shown by the chain line L2 and two-dot chain line L3 in FIG. 2, the fluctuation amount of the actual air-fuel ratio AF increases as the deviation of the air-fuel ratio among the cylinders increases.

In light of this point, in the imbalance abnormality determination process, the change amount per unit time (change rate) of the actual air-fuel ratio AF to be detected by the air-fuel ratio sensor 46 is calculated, and whether the change rate is a predetermined rate Jv or higher is determined. Then, when the change rate of the actual air-fuel ratio AF is the predetermined rate Jv or higher, the fluctuation amount of the actual air-fuel ratio AF is large, and therefore, it is determined that the imbalance abnormality has occurred. On the other hand, when the change rate of the actual air-fuel ratio AF is lower than the predetermined rate Jv, the fluctuation amount of the actual air-fuel ratio AF is small, and therefore, it is not determined that the imbalance abnormality has occurred. Here, the imbalance abnormality determination process, as an interrupt process, is executed at a predetermined interval by the electronic control unit 40.

Further, in the embodiment, a process (catalyst deterioration abnormality determination process) of determining the occurrence of the deterioration abnormality of the exhaust gas purification catalyst 21 is executed. In the catalyst deterioration abnormality determination process, the amount (oxygen storage amount C) of the oxygen that can be stored in the exhaust gas purification catalyst 21 is evaluated. Specifically, first, the air-fuel ratio of the air-fuel mixture is changed to a rich ratio. Thereby, the oxygen stored in the exhaust gas purification catalyst 21 is forcibly released. Then, the air-fuel ratio of the air-fuel mixture is maintained at the rich ratio, until the output signal of the O2 sensor 47 has a value that indicates a property corresponding to a rich gas.

Thereafter, when the output signal of the O2 sensor 47 has a value that indicates a property corresponding to a rich gas, almost all of the oxygen stored in the exhaust gas purification catalyst 21 has been released, and therefore, the air-fuel ratio of the air-fuel mixture is switched to a lean ratio. Thereby, subsequently, oxygen is stored in the exhaust gas purification catalyst 21. Then, the air-fuel ratio of the air-fuel mixture is maintained at the lean ratio, in a period until the output signal of the O2 sensor 47 has a value that indicates a property corresponding to a lean gas. In this period, the amount of the oxygen stored in the exhaust gas purification catalyst 21 is successively calculated based on the actual air-fuel ratio AF detected by the air-fuel ratio sensor 46, and the integrated value of the oxygen amount is calculated.

Thereafter, when the output signal of the O2 sensor 47 has a value that indicates a property corresponding to a lean gas, the amount of the oxygen stored in the exhaust gas purification catalyst 21 becomes the greatest amount by saturation, and therefore, the integrated value of the oxygen amount at this time is stored as the oxygen storage amount C of the exhaust gas purification catalyst 21.

In the catalyst deterioration abnormality determination process, whether the oxygen storage amount C is a previously decided determination value J1 or greater is determined. Then, in the case where the oxygen storage amount C is less than the determination value J1, there is a high possibility that the oxygen storage capacity of the exhaust gas purification catalyst 21 has decreased and the exhaust gas purification catalyst 21 has deteriorated, and therefore, it is determined that the deterioration abnormality of the exhaust gas purification catalyst 21 has occurred. On the other hand, in the case where the oxygen storage amount C is the determination value J1 or greater, the oxygen storage capacity is high, and the exhaust gas purification catalyst 21 is properly functioning. Therefore, it is not determined that the deterioration abnormality of the exhaust gas purification catalyst 21 has occurred. Here, the catalyst deterioration abnormality determination process, as an interrupt process, is executed at a predetermined interval by the electronic control unit 40.

Furthermore, in the embodiment, a process (sensor deterioration abnormality determination process) of determining the occurrence of the deterioration abnormality of the O2 sensor 47 is executed. If the responsivity is low due to the deterioration of the O2 sensor 47, the output signal of the O2 sensor 47 is not switched immediately to a value that indicates a property corresponding to a lean gas when the property of the exhaust gas is switched from a property corresponding to a rich gas to a property corresponding to a lean gas. Therefore, in the above-described calculation of the oxygen storage amount C, the calculation of the integrated value of the amount of the oxygen stored in the exhaust gas purification catalyst 21 is continued for a needlessly long time, so that the integrated value and further the oxygen storage amount C become very great amounts. Accordingly, it is possible to determine the occurrence of the deterioration abnormality of the O2 sensor 47, by whether the oxygen storage amount C is a very great amount.

In light of this point, in the sensor deterioration abnormality determination process, whether the oxygen storage amount C stored in the electronic control unit 40 is a previously decided determination value J2 or greater (here, J2>J1) is determined. Then, in the case where the oxygen storage amount C is the determined value J2 or greater, the oxygen storage amount C is a very great amount, and therefore, it is determined that the deterioration abnormality of the O2 sensor 47 has occurred. On the other hand, in the case where the oxygen storage amount C is less than the determination value J2, the oxygen storage amount C is not as great an amount as it is likely to be the deterioration abnormality of the O2 sensor 47, and therefore, it is not determined that the deterioration abnormality of the O2 sensor 47 has occurred. Here, the catalyst deterioration abnormality determination process, as an interrupt process, is executed at a predetermined interval by the electronic control unit 40.

Here, when the fuel tank 31 is refueled with a fuel having a different alcohol concentration, a difference in the alcohol concentration of the fuel is sometimes made between the first fuel passage 34A for feeding the fuel to the passage injection valve 16 and the second fuel passage 34B for feeding the fuel to the cylinder injection valve 17, in a process of the change in the alcohol concentration of the fuel in the fuel passage. For example, when the fuel injection is executed only by the passage injection valve 16, the fuel in the first fuel passage 34A is exchanged, but the fuel in the second fuel passage 34B is not exchanged. Therefore, a difference in the alcohol concentration of the fuel is made between the first fuel passage 34A and the second fuel passage 34B.

If the engine operation state changes with such a difference made and the port injection ratio Rp changes, the proportion of the alcohol contained in the fuel that is injected from both injection valves 16, 17 into the cylinder before the change in the engine operation state and the proportion of the alcohol contained in the fuel that is injected from both injection valves 16, 17 into the cylinder after the change in the engine operation state become different in value from each other. Then, at this time, the oxygen concentration of the exhaust gas also changes. During the operation of the internal combustion engine 10, the port injection ratio Rp frequently changes in association with the change in the operation state (the engine speed NE, the intake air amount GA), and therefore, when there is a difference in the alcohol concentration, the oxygen concentration of the exhaust gas fluctuates.

Therefore, when the imbalance abnormality determination process, the catalyst deterioration abnormality determination process or the sensor deterioration abnormality determination process is executed in a state in which the difference in the alcohol concentration of the fuel is made between the first fuel passage 34A and the second fuel passage 34B, the oxygen concentration of the exhaust gas is likely to change during the execution. In this case, the detection signal of the air-fuel ratio sensor 46 or the detection signal of the O2 sensor 47 changes needlessly, causing the decrease in the determination accuracy.

For details, in the imbalance abnormality determination process, when the passage injection valve 16 or the cylinder injection valve 17 is not deteriorated too much and the variation in the fuel injection amount among the cylinders is hardly generated, the variation in the oxygen concentration of the exhaust gas is generated among the cylinders, due to the variation in the proportion of the alcohol contained in the fuel among the cylinders, leading to a fear of falsely determining that the imbalance abnormality has occurred.

Further, the flow of the exhaust gas in the exhaust passage 20 of the internal combustion engine 10 is biased, and there is a tendency that the exhaust gas ejected from a particular cylinder passes near an arrangement part for the air-fuel ratio sensor 46. In the execution of the catalyst deterioration abnormality determination process or the sensor deterioration abnormality determination process, when the variation in the oxygen concentration of the exhaust gas is generated among the cylinders, the air-fuel ratio sensor 46 cannot properly detect the oxygen concentration of the exhaust gas from the cylinders, although the air-fuel ratio sensor 46 can detect the oxygen concentration of the exhaust gas from the particular cylinder. Accordingly, the oxygen storage amount C of the exhaust gas purification catalyst 21 cannot be properly calculated. Therefore, in this case, there is a fear of the false determination in the catalyst deterioration abnormality determination process or the sensor deterioration abnormality determination process, in which the oxygen storage amount C is used as a determination parameter.

In the embodiment, the alcohol concentration ALp of the fuel in the first fuel passage 34A (for details, the delivery pipe 35A) and the alcohol concentration ALd of the fuel in the second fuel passage 34B (for details, the delivery pipe 35B) are detected based on the alcohol concentration AL detected by the concentration sensor 45. Then, when a difference ΔAL between the alcohol concentration ALp and the alcohol concentration ALd is less than a determination value, the execution of the abnormality determinations (the imbalance abnormality determination process, the catalyst deterioration abnormality determination process and the sensor deterioration abnormality determination process) is permitted. On the other hand, when the difference ΔAL is the determination value or greater, the execution of the abnormality determinations is prohibited.

In the following, a procedure of determining whether to execute the abnormality determinations in this way will be described in detail. First, a procedure of detecting the alcohol concentration ALp of the fuel in the delivery pipe 35A and the alcohol concentration ALd of the fuel in the delivery pipe 35B will be described with reference to FIG. 3.

Hereinafter, the volume of a fuel path (a path denoted by reference character L0 in FIG. 3) that is of the common passage 32 and that is from an arrangement part for the concentration sensor 45 to a connection part with the first fuel passage 34A and the second fuel passage 34B is represented as "V0". Further, the volume of a fuel path (a path denoted by reference character L1 in FIG. 3) that is of the first fuel passage 34A and that is from a connection part with the common passage 32 to a fuel inlet part 37A of the delivery pipe 35A is represented as "V1". The volume of a fuel path (a path denoted by reference character L2 in FIG. 3) that is of the second fuel passage 34B and that is from a connection part with the common passage 32 to a fuel inlet part 37B of the delivery pipe 35B is represented as "V2".

Figure 3:
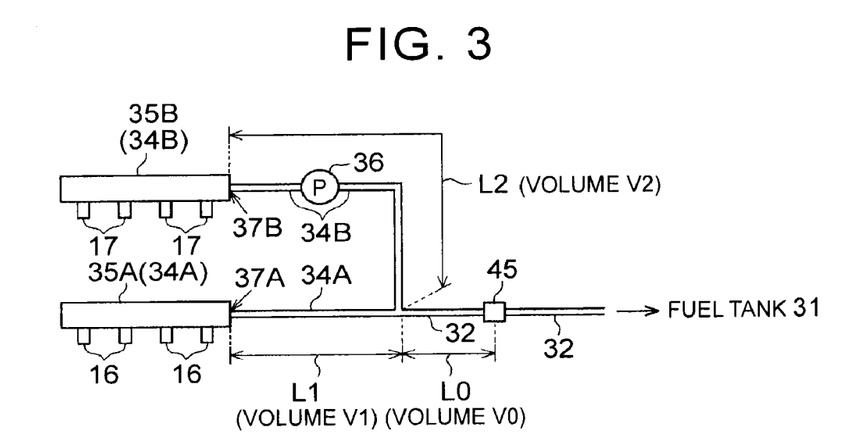
FIG. 3 is a simplified diagram schematically showing a structure of a fuel passage.

When the fuel tank 31 is refueled with a fuel having a different alcohol concentration, the alcohol concentration of the fuel in the fuel tank 31 changes. Then, whenever the fuel injection from the passage injection valve 16 and the cylinder injection valve 17 is repeated by the operation of the internal combustion engine 10, the fuel (after-refueling fuel) in the fuel tank 31, whose alcohol concentration has changed, is sucked into the common passage 32, by the amount of the fuel injected from the injection valves 16, 17.

When the after-refueling fuel reaches the arrangement part for the concentration sensor 45 of the common passage 32 by the repeat of the fuel injection from the passage injection valve 16 and the cylinder injection valve 17, the alcohol concentration AL of the after-refueling fuel is detected by the concentration sensor 45.

Then, when the sum of the amount of the fuel injected from the passage injection valve 16 and the amount of the fuel injected from the cylinder injection valve 17 after the detection of the alcohol concentration AL becomes equal to the volume V0, the fuel in the common passage 32 has been exchanged with the above after-refueling fuel.

Furthermore, when the total amount of the fuel subsequently injected from the passage injection valve 16 becomes equal to the volume V1, the fuel in the part that is of the first fuel passage 34A and that leads to the fuel inlet part 37A of the delivery pipe 35A has been exchanged with the above after-refueling fuel. Thereafter, whenever the fuel is injected from the passage injection valve 16, the after-refueling fuel flows into the delivery pipe 35A by the amount of the injected fuel, and the alcohol concentration of the fuel in the delivery pipe 35A changes.

On the other hand, when the total amount of the fuel injected from the cylinder injection valve 17 after the fuel in the common passage 32 has been exchanged with the above after-refueling fuel becomes equal to the volume V2, the fuel in the part that is of the second fuel passage 34B and that leads to the fuel inlet part 37B of the delivery pipe 35B has been exchanged with the above after-refueling fuel. Thereafter, whenever the fuel is injected from the cylinder injection valve 17, the after-refueling fuel flows into the delivery pipe 35B by the amount of the injected fuel, and the alcohol concentration of the fuel in the delivery pipe 35B changes.

Thus, in the apparatus according to the embodiment, it is possible to figure out the alcohol concentration of the fuel in each part of the fuel passage, from the relation of the alcohol concentration AL detected by the concentration sensor 45, the amount of the fuel injected from the passage injection valve 16, and the amount of the fuel injected from the cylinder injection valve 17. In light of this point, in the embodiment, the alcohol concentration of the fuel to flow into the delivery pipe 35A and the alcohol concentration of the fuel to flow into the delivery pipe 35B are estimated, based on the alcohol concentration AL detected by the concentration sensor 45, the amount of the fuel injected from the passage injection valve 16, and the amount of the fuel injected from the cylinder injection valve 17.

Then, in the embodiment, assuming that the alcohol concentration in the delivery pipe 35A is always uniform, the average concentration of the fuel in the delivery pipe 35A is detected as the alcohol concentration ALp, based on the alcohol concentration estimated in that way. Specifically, the alcohol concentration ALp stored in the electronic control unit 40 is represented as "ALp [last value]", the volume of the delivery pipe 35A is represented as "Vp", the fuel injection amount (in the embodiment, the target port injection amount Tqp) from the passage injection valve 16 is represented as "Fp", and the alcohol concentration of the fuel to flow into the delivery pipe 35A is represented as "ALbp". In this case, the alcohol concentration ALp is calculated from the following relational expression (1).

$$ALp = \{(Vp-Fp) \times ALp[\text{last value}] + (Fp \times ALbp)\}/Vp \quad (1)$$

Further, in the embodiment, assuming that the alcohol concentration in the delivery pipe 35B is always uniform, the average concentration of the fuel in the delivery pipe 35B is calculated as the alcohol concentration ALd, based on the alcohol concentration of the fuel to flow into the delivery pipe 35B estimated as described above. Specifically, the alcohol concentration ALd stored in the electronic control unit 40 is represented as "ALd [last value]", the volume of the delivery pipe 35B is represented as "Vd", the fuel injection amount (in the embodiment, the target cylinder injection amount Tqc) from the cylinder injection valve 17 is represented as "Fd", and the alcohol concentration of the fuel to flow into the delivery pipe 35B is represented as "ALbd". In this case, the alcohol concentration ALd is calculated from the following relational expression (2).

$$ALd = \{(Vd-Fd) \times ALd[\text{last value}] + (Fd \times ALbd)\}/Vd \quad (2)$$

Figure 4:
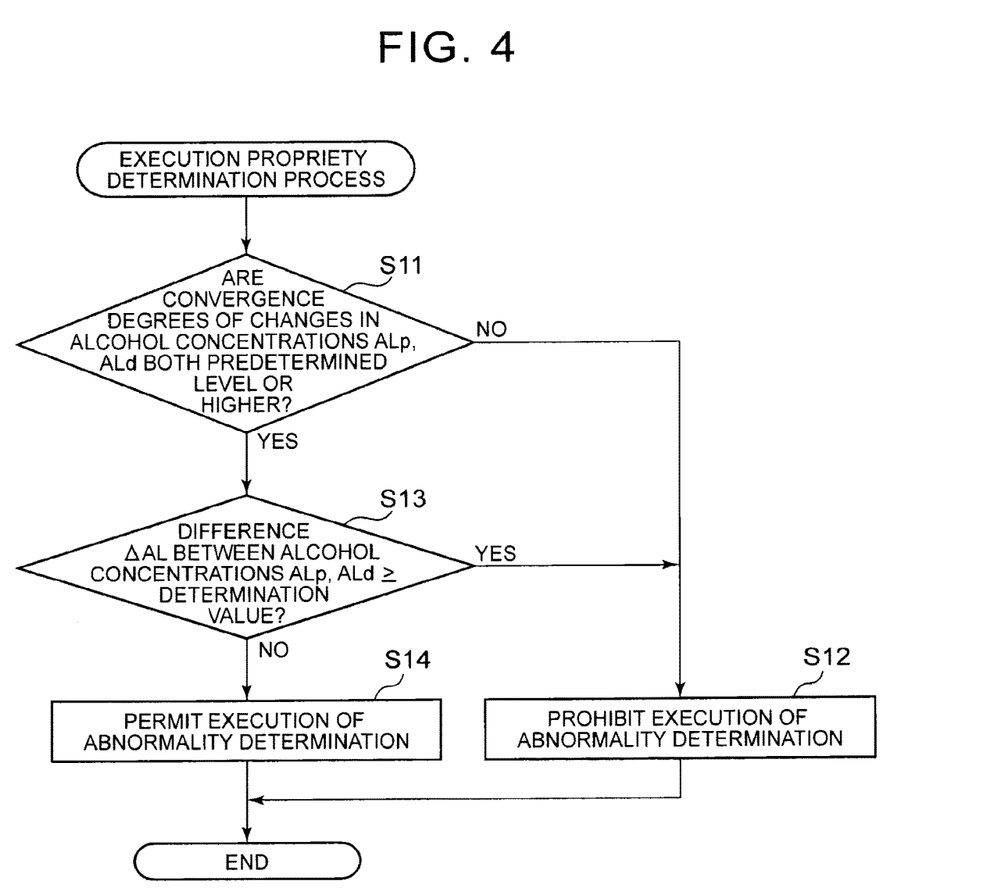
FIG. 4 is a flowchart showing an execution procedure of an execution propriety determination process.

Next, an execution procedure of a process (execution propriety determination process) of determining whether to execute the abnormality determinations based on the alcohol concentrations ALp, ALd will be described with reference to FIG. 4. Here, FIG. 4 shows the execution procedure of the execution propriety determination process, and a series of processes shown in a flowchart of the figure, as an interrupt process, is executed at a predetermined interval by the electronic control unit 40.

In the process, first, the electronic control unit 40 determines whether both the convergence degree of the change in the alcohol concentration ALp and the convergence degree of the change in the alcohol concentration ALd, after the alcohol concentration of the fuel in the fuel tank 31 changes in association with the refueling, are a predetermined level (in the embodiment, 80%) or higher (step S11). In the process of step S11, when the alcohol concentration AL before the concentration change is represented as "AL [before change]" and the alcohol concentration AL after the concentration change is represented as "AL [after change]", convergence degree Ralp of the alcohol concentration ALp is calculated from the following relational expression (3), and convergence degree Rald of the alcohol concentration ALd is calculated from the following relational expression (4).

$$Ralp = (ALp - AL[\text{before change}])/(AL[\text{after change}] - AL[\text{before change}]) \quad (3)$$

$$Rald = (ALd - AL[\text{before change}])/(AL[\text{after change}] - AL[\text{before change}]) \quad (4)$$

Then, when the above convergence degree Ralp is equal to or greater than a previously decided determination value (in the embodiment, "0.8"), it is determined that the convergence degree of the change in the alcohol concentration ALp is the predetermined level or higher. Further, when the convergence degree Rald is equal to or greater than the previously decided determination value (in the embodiment, "0.8"), it is determined that the convergence degree of the change in the alcohol concentration ALd is the predetermined level or higher.

When at least one of the condition that the convergence degree of the change in the alcohol concentration ALp is the predetermined level or higher and the condition that the convergence degree of the change in the alcohol concentration ALd is the predetermined level or higher is not satisfied (step S11: NO), the execution of the abnormality determinations is prohibited (step S12).

When the change in the alcohol concentration ALp or the change in the alcohol concentration ALd associated with the refueling has not converged, there is a fear that the difference ΔAL between the alcohol concentrations ALp, ALd increases. Further, even when the difference ΔAL between the alcohol concentrations ALp, ALd at this time is small, there is a possibility that the difference ΔAL increases due to a subsequent progression of the changes in the alcohol concentrations ALp, ALd. Therefore, when the above-described abnormality determinations are executed in a situation in which the change in the alcohol concentration ALp or the change in the alcohol concentration ALd has not converged, there is a fear of causing the decrease in the determination accuracy of the abnormality determinations. In this regard, according to the embodiment, the execution of the abnormality determinations is prohibited, when the convergence degrees of the changes in the alcohol concentrations ALp, ALd are low, and therefore, the decrease in the determination accuracy of the abnormality determinations is inhibited.

On the other hand, in the case where both the convergence degree of the change in the alcohol concentration ALp and the convergence degree of the change in the alcohol concentration ALd are the predetermined level or higher (step S11: YES), whether the difference ΔAL between the alcohol concentration ALp and the alcohol concentration ALd is a determination value or greater is determined (step S13). Then, when the above difference ΔAL is the determination value or greater (step S13: YES), the execution of the abnormality determinations is prohibited (step S12).

According to the embodiment, when the difference ΔAL between the alcohol concentration ALp and the alcohol concentration ALd is large due to the refueling and therefore there is a possibility of the decrease in the determination accuracy of the abnormality determination based on the detection signal of the air-fuel ratio sensor 46, the execution of the abnormality determination is prohibited. Therefore, it is possible to inhibit the decrease in the determination accuracy of the abnormality determination associated with the refueling. Here, in the embodiment, the range of the difference ΔAL that allows the decrease in the determination accuracy to be inhibited by the prohibition of the execution of the abnormality determinations is previously evaluated based on the results of various experiments and simulations, and the lower limit of the range is stored in the electronic control unit 40, as the determination value for the process of step S13.

Meanwhile, in the case where both the convergence degree of the change in the alcohol concentration ALp and the convergence degree of the change in the alcohol concentration ALd are the predetermined level or higher (step S11: YES) and where the difference ΔAL between the alcohol concentration ALp and the alcohol concentration ALd is less than the determination value (step S13: YES), the execution of the abnormality determinations is permitted (step S14).

At this time, the difference between the alcohol concentrations ALp, ALd is small. Furthermore, the changes in the alcohol concentrations ALp, ALd have converged to some extent. Therefore, there is a low possibility that the difference ΔAL between the alcohol concentrations ALp, ALd increases. Accordingly, there is a low possibility that the difference ΔAL causes the decrease in the determination accuracy, and therefore, the execution of the abnormality determinations is permitted. By permitting the execution of the abnormality determinations in this way, the decrease in the determination accuracy of the abnormality determinations is inhibited while the execution opportunity of the abnormality determinations is secured.

Here, in the apparatus according to the embodiment, when the refueling of the fuel tank 31 is performed, the distribution of the alcohol concentration is temporarily made in the fuels within the delivery pipes 35A, 35B. However, the influence of the concentration distribution on the abnormality determinations, which is smaller compared to the influence of the above-described difference ΔAL between the alcohol concentrations ALp, ALd, does not matter too much. In the embodiment, the average concentrations of the fuels in the delivery pipes 35A, 35B are detected as the alcohol concentrations ALp, ALd. Therefore, it is possible to calculate the difference in alcohol concentration between the fuel in the delivery pipe 35A and the fuel in the delivery pipe 35B, in a simple calculation manner, while the alcohol concentrations of the fuels in the delivery pipes 35A, 35B are regarded as being not distributed. Accordingly, it is possible to execute, in a simple manner, the determination of whether to execute the abnormality determinations, based on the difference ΔAL between the alcohol concentrations ALp, ALd.

Figure 5:
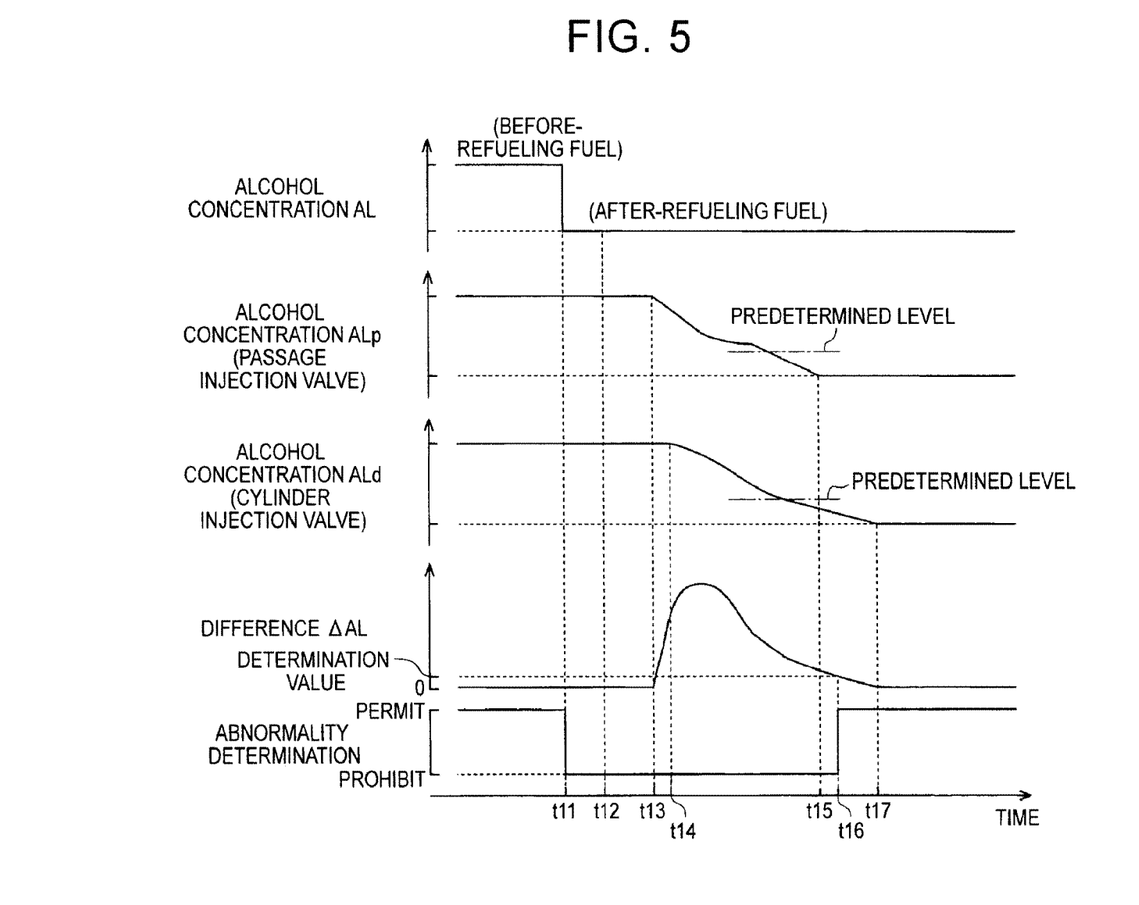
FIG. 5 is a timing chart showing an exemplary execution manner of the execution propriety determination process.

(Action) In the following, an execution manner of the execution propriety determination process will be described with reference to FIG. 5. In an example shown in FIG. 5, at a timing before time t11, the fuel tank 31 is refueled with a fuel that is different in alcohol concentration from the fuel stored in the fuel tank 31. Thereafter, the internal combustion engine 10 is operated, and the fuel injection from the passage injection valve 16 and the cylinder injection valve 17 is executed.

Then, at time t11, the fuel (the above after-refueling fuel), whose alcohol concentration has changed due to the refueling, reaches the arrangement part for the concentration sensor 45, and thereby, the alcohol concentration AL of the fuel to be detected by the concentration sensor 45 changes from the alcohol concentration of the fuel (before-refueling fuel) in the fuel tank 31 before the refueling to the alcohol concentration of the after-refueling fuel. In association with this, the convergence degrees of the changes in the alcohol concentrations ALp, ALd become less than the predetermined level, and therefore, the subsequent execution of the abnormality determinations is prohibited.

Thereafter, in a period from time t11 to time t12, the fuel in the common passage 32 is exchanged with the after-refueling fuel. Then, at time t12, almost all of the fuel in the common passage 32 has been exchanged with the after-refueling fuel. Thereafter (after time t12), the fuel in the first fuel passage 34A is gradually exchanged with the after-refueling fuel, in association with the fuel injection from the passage injection valve 16, and the fuel in the second fuel passage 34B is gradually exchanged with the after-refueling fuel, in association with the fuel injection from the cylinder injection valve 17.

At this time (time t11 to time t13), the after-refueling fuel does not flow into the delivery pipes 35A, 35B, and therefore, the alcohol concentrations of the fuels in the delivery pipes 35A, 35B do not change. However, depending on the subsequent execution manner of the fuel injection from the passage injection valve 16 and the cylinder injection valve 17, there is a possibility that the alcohol concentrations of the fuels in the delivery pipes 35A, 35B change immediately, and thereby, there is a possibility of causing the decrease in the determination accuracy of the abnormality determinations. Therefore, the execution of the abnormality determinations is prohibited.

Thereafter, the fuel in the first fuel passage 34A is exchanged, and thereby, at time t13, the after-refueling fuel starts to flow into the delivery pipe 35A. Therefore, after time t13, the alcohol concentration ALp changes, and in association with this, the difference ΔAL between the alcohol concentration ALp and the alcohol concentration ALd increases. At this time, since a difference is made between the alcohol concentrations of the fuels in the delivery pipes 35A, 35B, there is a fear of causing the decrease in the determination accuracy of the abnormality determinations in the case where the fluctuation in the port injection ratio Rp associated with the change in the engine operation state generates the variation in the oxygen concentration of the exhaust gas among the cylinders. Therefore, the prohibition of the execution of the abnormality determinations is continued.

Further, the fuel in the second fuel passage 34B is exchanged, and thereby, at time t14, the after-refueling fuel starts to flow into the delivery pipe 35B. Therefore, after time t14, the alcohol concentrations ALp, ALd both change, and the difference ΔAL between the alcohol concentrations ALp, ALd also change. Then, since the state in which the above difference ΔAL is the determination value or greater is continued in the example, the prohibition of the execution of the abnormality determinations is continued.

In a period from time t14 to time t15, the alcohol concentrations ALp, ALd change, and in the latter half, the difference ΔAL between the alcohol concentrations ALp, ALd gradually decreases. Then, at time t15, the alcohol concentration of the fuel in the delivery pipe 35A has changed to the alcohol concentration of the after-refueling fuel, and the change in the alcohol concentration ALp has converged. At this time, the change in the alcohol concentration ALd also has converged to some extent, and the convergence degrees of the changes in the alcohol concentrations ALp, ALd both are the predetermined level or higher. However, the difference ΔAL between the alcohol concentrations ALp, ALd is the determination value or greater, and therefore, the prohibition of the execution of the abnormality determinations is continued.

Thereafter, at time t16, the above difference ΔAL becomes less than the predetermined value, resulting in a situation in which the abnormality determinations can be accurately executed. Therefore, the execution of the abnormality determinations is permitted. Thereafter, at time t17, the alcohol concentration of the fuel in the delivery pipe 35B has changed to the alcohol concentration of the after-refueling fuel, and the change in the alcohol concentration ALd has converged.

As described above, according to the embodiment, the following effects are obtained. (1) When the difference ΔAL between the alcohol concentrations ALp, ALd is the determination value or greater, the execution of the abnormality determinations is prohibited. Therefore, it is possible to inhibit the false determination associated with refueling, and to inhibit the decrease in the determination accuracy of the abnormality determinations.

(2) It is possible to accurately detect the alcohol concentrations ALp, ALd, based on the relation of the alcohol concentration AL detected by the concentration sensor 45, the amount of the fuel injected from the passage injection valve 16 and the amount of the fuel injected from the cylinder injection valve 17.

(3) The average concentration of the fuel in the delivery pipe 35A is detected as the alcohol concentration ALp, and the average concentration of the fuel in the delivery pipe 35B is detected as the alcohol concentration ALd. Therefore, it is possible to calculate the difference ΔAL between the alcohol concentrations ALp, ALd, in a simple calculation manner, while the alcohol concentrations of the fuels in the delivery pipes 35A, 35B are regarded as being not distributed. Accordingly, it is possible to execute, in a simple manner, the determination of whether to execute the abnormality determinations, based on the difference ΔAL between the alcohol concentrations ALp, ALd.

(4) The execution of the abnormality determinations is prohibited, when at least one of the condition that the convergence degree of the change in the alcohol concentration ALp is the predetermined level or higher and the condition that the convergence degree of the change in the alcohol concentration ALd is the predetermined level or higher is not satisfied in the process during which the alcohol concentrations of the fuels in the fuel passages 34A, 34B change due to the change in the alcohol concentration of the fuel in the fuel tank 31. Therefore, it is possible to prohibit the execution of the abnormality determinations, when the convergence degree of the change in the alcohol concentration ALp or the alcohol concentration ALd is low and there is a fear that the execution of the abnormality determinations causes the decrease in the determination accuracy.

Here, the above embodiment may be modified and carried out as follows. The determination parameter to be used in the imbalance abnormality determination process only needs to be a value that is correlated with the fluctuation amount of the actual air-fuel ratio AF, and the magnitude of the slope of the output signal of the air-fuel ratio sensor 46, the change amount of the actual air-fuel ratio AF in a predetermined period, or the like can be employed as the determination parameter.

Any one or two of the imbalance abnormality determination process, the catalyst deterioration abnormality determination process and the sensor deterioration abnormality determination process may be omitted. Further, the abnormality determination apparatus in the above embodiment is not limited to an apparatus that executes the imbalance abnormality determination process, the catalyst deterioration abnormality determination process and the sensor deterioration abnormality determination process, and can be applied to any apparatus that executes a process of determining whether the abnormality of a determination object device has occurred, based on the detection signal of the air-fuel ratio sensor 46 or the detection signal of the O2 sensor 47.

The condition for determining that the convergence degree of the change in the alcohol concentration ALp (or the alcohol concentration ALd) is the predetermined level or higher can be arbitrarily modified. For example, the determination that the above convergence degree is the predetermined level or higher may be made, when the difference between the alcohol concentration of the after-refueling fuel and the alcohol concentration ALp (or the alcohol concentration ALd) is a predetermined value or less. In addition, for example, the determination that the above convergence degree is the predetermined level or higher may be made, when the integrated value of the fuel injection amount from the passage injection valve 16 (or the cylinder injection valve 17) after the change in the alcohol concentration AL to be detected by the concentration sensor 45 is a predetermined amount or greater.

The process of step S11 in the execution propriety determination process (FIG. 4) may be omitted. Even such an apparatus can prohibit the execution of the abnormality determination and can inhibit the decrease in the determination accuracy of the abnormality determination, when the difference ΔAL between the alcohol concentrations ALp, ALd is large. Furthermore, according to the above apparatus, even when the changes in the alcohol concentrations ALp, ALd have not converged, the decrease in the determination accuracy of the abnormality determination is inhibited if the difference ΔAL between alcohol concentrations ALp, ALd is small, and therefore, it is possible to permit the execution of the abnormality determination. Therefore, it is possible to inhibit the decrease in the determination accuracy, and therewith, to increase the execution opportunity of the abnormality determination.

The alcohol concentration ALp may be detected, in consideration of the distribution of the alcohol concentration in the delivery pipe 35A, which is figured out from the shape, volume and others of the delivery pipe 35A. Further, the alcohol concentration ALd may be detected, in consideration of the distribution of the alcohol concentration in the delivery pipe 35B, which is figured out from the shape, volume and others of the delivery pipe 35B. Thereby, it is possible to accurately detect the alcohol concentration of the fuel actually injected from the passage injection valve 16 and the alcohol concentration of the fuel actually injected from the cylinder injection valve 17, and to determine whether to execute the abnormality determination, based on the alcohol concentrations. Therefore, it is possible to properly determine whether to execute the abnormality determination, and to suitably inhibit the decrease in the determination accuracy of the abnormality determination.

The concentration sensor for detecting the alcohol concentration of the fuel may be provided in each of the first fuel passage 34A and the second fuel passage 34B. In this case, it is preferable that the concentration sensor be provided in each of the delivery pipes 35A, 35B.

What is claimed is:

1. An abnormality determination apparatus that performs abnormality determination for a determination object device based on a detection signal of an oxygen sensor provided in an exhaust passage of an internal combustion engine, comprising:

the internal combustion engine including
a passage injection valve that injects fuel into an intake passage, and
a cylinder injection valve that directly injects the fuel into a cylinder,
the internal combustion engine being applied to a multi-cylinder internal combustion engine capable of using gasoline and alcohol as the fuel,
the abnormality determination apparatus comprising an electronic control unit programmed to
determine alcohol concentration of the fuel in a first fuel passage and alcohol concentration of the fuel in a second fuel passage, the first fuel passage being a passage through which the fuel is fed to the passage injection valve, the second fuel passage being a passage through which the fuel is fed to the cylinder injection valve, and
prohibit execution of the abnormality determination, when a difference between the alcohol concentration of the fuel in the first fuel passage and the alcohol concentration of the fuel in the second fuel passage is a determination value or greater.

2. The abnormality determination apparatus according to claim 1, wherein
a fuel passage that distributes and feeds the fuel to the passage injection valve and the cylinder injection valve is provided with a common passage, the common passage being provided with a concentration sensor that detects alcohol concentration of the fuel, one end of the common passage being connected with a fuel tank in which the fuel is stored, the other end of the common passage being connected with the first fuel passage and the second fuel passage, and
the electronic control unit is programmed to determine the alcohol concentration of the fuel in the first fuel passage and the alcohol concentration of the fuel in the second fuel passage, based on the relation of the alcohol concentration detected by the concentration sensor, an amount of the fuel injected from the passage injection valve and an amount of the fuel injected from the cylinder injection valve.

3. The abnormality determination apparatus according to claim 1, wherein
a connection part between the first fuel passage and the passage injection valve forms a first delivery pipe,
a connection part between the second fuel passage and the cylinder injection valve forms a second delivery pipe, and
the electronic control unit is programmed to
(i) determine average concentration of the fuel in the first delivery pipe, as the alcohol concentration of the fuel in the first fuel passage, and
(ii) determine average concentration of the fuel in the second delivery pipe, as the alcohol concentration of the fuel in the second fuel passage.

4. The abnormality determination apparatus according to claim 1, wherein
the electronic control unit is programmed to prohibit the execution of the abnormality determination, when at least one of a first condition and a second condition is not satisfied in a process during which the alcohol concentration of the fuel in the first fuel passage and the alcohol concentration of the fuel in the second fuel passage change due to a change in alcohol concentration associated with refueling,
the first condition being a condition that convergence degree of the change in the alcohol concentration of the fuel in the first fuel passage is a predetermined level or higher,
the second condition being a condition that convergence degree of the change in the alcohol concentration of the fuel in the second fuel passage is a predetermined level or higher.

* * * * *